United States Patent
Gilmore et al.

(10) Patent No.: US 9,512,886 B1
(45) Date of Patent: Dec. 6, 2016

(54) LEAD SCREW ACTUATOR HAVING AXIALLY MOVABLE PLUNGER WITH COMPLIANCE IN BOTH AXIAL DIRECTIONS

(71) Applicant: American Axle & Manufacturing, Inc., Detroit, MI (US)

(72) Inventors: Curt D. Gilmore, Fenton, MI (US); Daryl Beesley, South Lyon, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 0 days.

(21) Appl. No.: 15/228,410

(22) Filed: Aug. 4, 2016

Related U.S. Application Data

(63) Continuation of application No. 14/571,885, filed on Dec. 16, 2014, now Pat. No. 9,458,895.

(51) Int. Cl.
| | | |
|---|---|---|
| F16D 19/00 | (2006.01) | |
| F16D 23/14 | (2006.01) | |
| F16D 28/00 | (2006.01) | |
| F16D 48/06 | (2006.01) | |
| F16D 23/12 | (2006.01) | |

(52) U.S. Cl.
CPC ............... *F16D 23/14* (2013.01); *F16D 28/00* (2013.01); *F16D 48/06* (2013.01); *F16D 2023/123* (2013.01)

(58) Field of Classification Search
CPC .... F16D 23/12; F16D 28/00; F16D 2023/123; F16D 23/14; F16D 48/06; F16H 25/2427
See application file for complete search history.

(56) References Cited

U.S. PATENT DOCUMENTS

| | | | |
|---|---|---|---|
| 3,929,255 A | | 12/1975 | Wittern et al. |
| 4,226,129 A | * | 10/1980 | Henderson .......... F16H 25/2427 74/424.74 |
| 5,689,997 A | * | 11/1997 | Schaller .................. F16H 61/32 74/335 |
| 5,720,531 A | | 2/1998 | Fulks |
| 5,775,469 A | * | 7/1998 | Kang ...................... F16F 15/03 188/162 |
| 5,788,008 A | | 8/1998 | Fort et al. |
| 6,883,396 B1 | | 4/2005 | Devenyi |
| 7,197,955 B2 | | 4/2007 | Sharma et al. |

(Continued)

FOREIGN PATENT DOCUMENTS

EP 1989962 A1 11/2008

*Primary Examiner* — David J Hlavka
(74) *Attorney, Agent, or Firm* — Harness, Dickey & Pierce, P.L.C.

(57) ABSTRACT

An actuator can include a coil spring, a plunger, and a rotating member. The coil spring can include a plurality of coils disposed about an axis. The plunger can include a body and a follower. The follower can be fixedly coupled to the body. The body can be disposed about the axis. The follower can be received between adjacent ones of the coils. The rotating member can be rotatable about the axis and drivingly coupled to one of the coil spring and the plunger to rotate the one of the coil spring and the plunger about the axis. Rotation of the rotatable member can effect translation of the plunger, compression of the coil spring, or both translation of the plunger and compression of the coil spring.

23 Claims, 5 Drawing Sheets

(56) References Cited

U.S. PATENT DOCUMENTS

| | | |
|---|---|---|
| 7,246,537 B1 | 7/2007 | Devenyi |
| 7,578,211 B1 | 8/2009 | Devenyi |
| 7,992,849 B2 | 8/2011 | Sugar et al. |
| 2002/0189385 A1 | 12/2002 | Drennen et al. |
| 2003/0178758 A1* | 9/2003 | Metelski .................. F16F 1/06 |
| | | 267/166 |
| 2008/0314712 A1* | 12/2008 | Cherubin .............. B60T 11/165 |
| | | 192/89.2 |
| 2010/0031761 A1* | 2/2010 | Daul ..................... B60N 2/233 |
| | | 74/89.24 |
| 2011/0220700 A1 | 9/2011 | Zink |
| 2013/0146417 A1* | 6/2013 | Lee ........................ F16D 23/12 |
| | | 192/93 R |
| 2013/0199885 A1 | 8/2013 | Quehenberger et al. |
| 2014/0353109 A1* | 12/2014 | Eguchi ................... F16D 28/00 |
| | | 192/84.6 |
| 2015/0167830 A1 | 6/2015 | Orita |
| 2016/0108972 A1* | 4/2016 | Downs ................. F16D 29/005 |
| | | 192/48.618 |

* cited by examiner

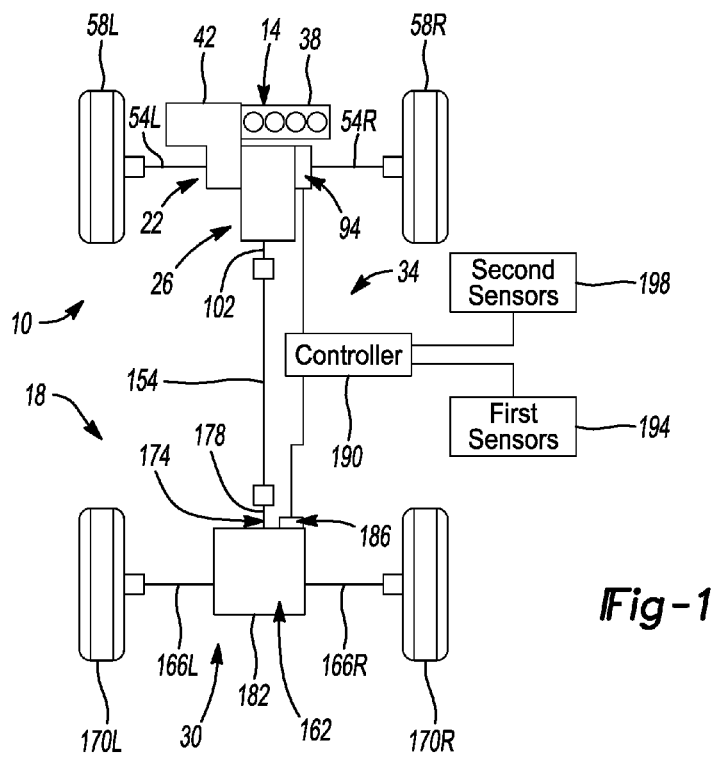
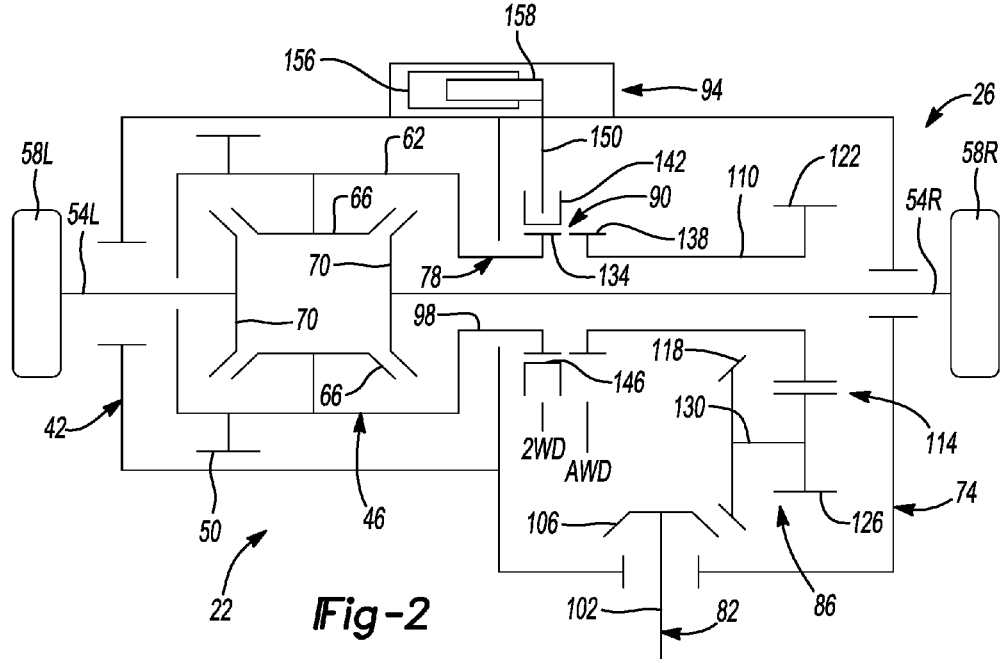

LEAD SCREW ACTUATOR HAVING AXIALLY MOVABLE PLUNGER WITH COMPLIANCE IN BOTH AXIAL DIRECTIONS

CROSS-REFERENCE TO RELATED APPLICATIONS

This application is a continuation of U.S. patent application Ser. No. 14/571,885 filed on Dec. 16, 2014. The entire disclosures of the above application is incorporated herein by reference.

FIELD

The present disclosure relates to a lead screw actuator having an axially movable plunger with compliance in both axial directions.

BACKGROUND

This section provides background information related to the present disclosure which is not necessarily prior art.

Power transmitting devices, such as clutches or transmissions for example, often require linear motion to translate one or more power transmitting elements, such as friction plates or shift forks for example, into or out of engagement positions. These engagement positions can selectively connect or disconnect a vehicle axle, such as switching between two and four-wheel (or all-wheel) drive modes for example. The engagement positions can alternatively switch between transmission gears, such as between low and high speed gear ratios for example. Various types of linear actuators exist to create such linear motion, such as hydraulic rams, rack and pinion gearing, or solenoids for example. However, there remains a need in the art for an improved actuator for providing linear motion in power transmitting devices.

SUMMARY

This section provides a general summary of the disclosure, and is not a comprehensive disclosure of its full scope or all of its features.

The present teachings provide for an actuator including a coil spring, a plunger, and a rotating member. The coil spring can include a plurality of coils disposed about an axis. The plunger can include a plunger body and a follower member. The follower member can be fixedly coupled to the plunger body. The plunger body can be disposed about the axis. The follower member can be received between adjacent ones of the plurality of coils. The rotating member can be rotatable about the axis and drivingly coupled to one of the coil spring and the plunger to rotate the one of the coil spring and the plunger about the axis. Rotation of the rotatable member can effect translation of the plunger, compression of the coil spring, or both translation of the plunger and compression of the coil spring.

The present teachings further provide for an actuator including an actuator housing, a first member, a plunger, and a rotating member. The first member can be disposed within the actuator housing and can have a plurality of threads disposed about an axis. The plurality of threads can be expandable and contractible along the axis. The first member can be non-rotatably coupled to one of the rotating member and the actuator housing. The plunger can include a plunger body and a follower member fixedly coupled to the plunger body. The follower member can extend radially from the plunger body between adjacent ones of the plurality of threads. The rotating member can be rotatable about the axis and drivingly coupled to one of the first member and the plunger body to rotate the one of the first member and the plunger body about the axis. Rotation of the rotatable member can effect translation of the plunger, compression of the threads, or both translation of the plunger and compression of the threads.

The present teachings further provide for an actuator including an actuator housing, an axially resilient member, a plunger, and a rotating member. The axially resilient member can be disposed within the actuator housing. The axially resilient member can include a first end, a second end, and a plurality of helical threads disposed about an axis and extending between the first and second ends. The first and second ends can be non-rotatably coupled to one of the rotating member and the actuator housing. The plunger can include a plunger body and a follower member fixedly coupled to the plunger body. The follower member can extend radially from the plunger body between adjacent threads of the axially resilient member. The rotating member can be rotatable about the axis and coupled to one of the axially resilient member and the plunger to rotate the one of the axially resilient member and the plunger about the axis. Rotation of the rotatable member can effect translation of the plunger, compression of the axially resilient member, or both translation of the plunger and compression of the axially resilient member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic of a motor vehicle having a disconnectable all-wheel drive system with a power transmitting device constructed in accordance with the teachings of the present disclosure;

FIG. 2 is a schematic illustration of a portion of the motor vehicle of FIG. 1, illustrating the power transmitting device in more detail;

Corresponding reference numerals indicate corresponding parts throughout the several views of the drawings.

DETAILED DESCRIPTION

Figure 3:
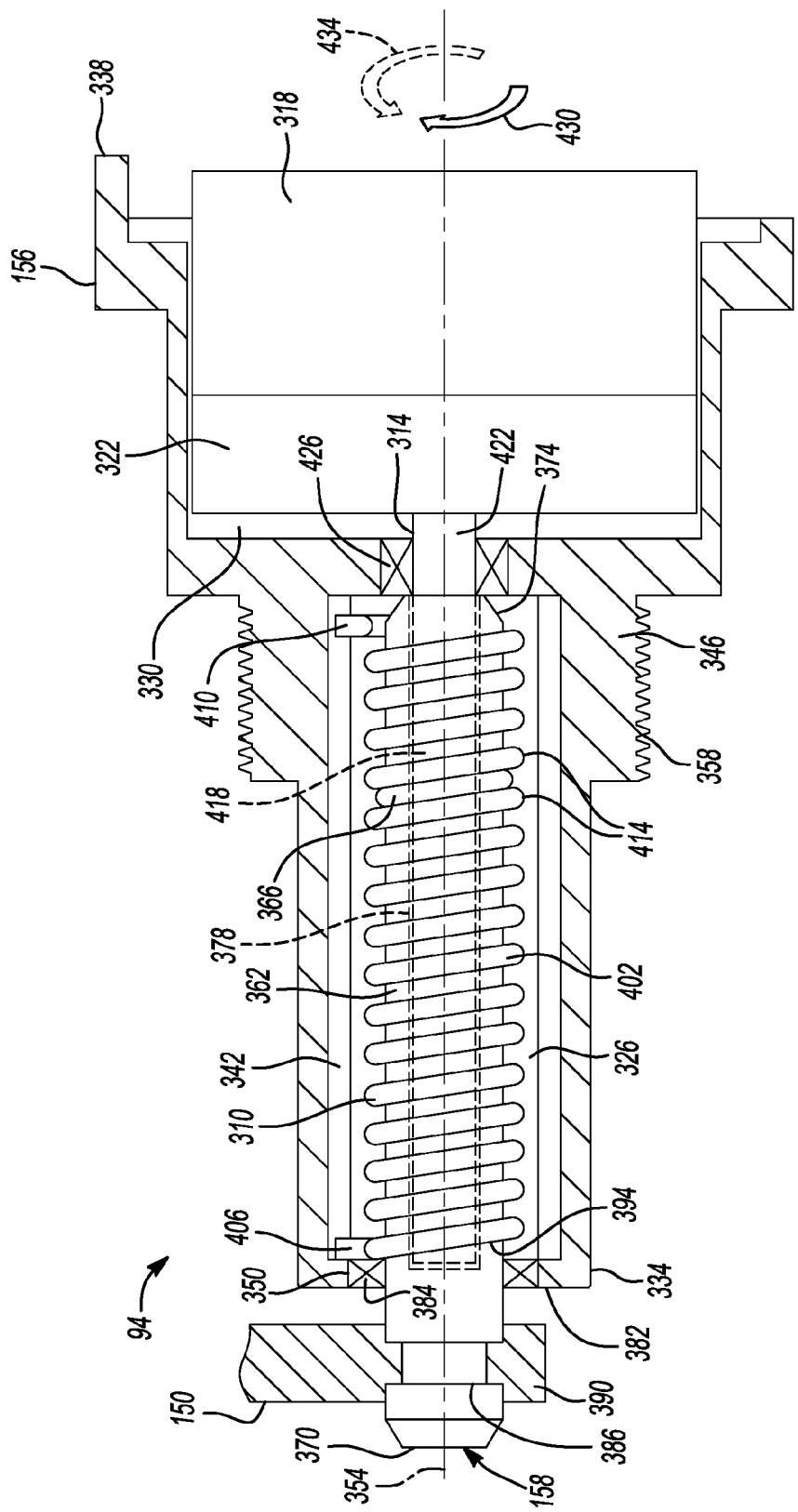
FIG. 3 is a section view of a portion of the power transmitting device of FIG. 1, illustrating an actuator of the power transmitting device of a first construction in more detail.

Example embodiments will now be described more fully with reference to the accompanying drawings.

With reference to FIGS. 1 and 2 of the drawings, a motor vehicle constructed in accordance with the teachings of the present disclosure is schematically shown and generally indicated by reference numeral 10. The vehicle 10 can include a powertrain 14 and a drivetrain 18 that can include a primary driveline 22, a power switching mechanism 26, a secondary driveline 30, and a control system 34. In the various aspects of the present teachings, the primary driveline 22 can be a front driveline while the secondary driveline 30 can be a rear driveline.

The powertrain 14 can include a prime mover 38, such as an internal combustion engine or an electric motor, and a transmission 42 which can be any type of ratio-changing mechanism, such as a manual, automatic, or continuously variable transmission. The prime mover 38 is operable to provide rotary power to the primary driveline 22 and the power switching mechanism 26.

The primary driveline 22 can include a primary or first differential 46 having an input member 50 driven by an output member (not shown) of the transmission 42. In the particular example shown, the first differential 46 is configured as part of the transmission 42, a type commonly referred to as a transaxle and typically used in front-wheel drive vehicles. The primary driveline 22 can further include a pair of first axleshafts 54L, 54R that can couple output components of the first differential 46 to a set of first vehicle wheels 58L, 58R. The first differential 46 can include a first differential case 62 that is rotatably driven by the input member 50, at least one pair of first pinion gears 66 rotatably driven by the first differential case 62, and a pair of first side gears 70. Each of the first side gears 70 can be meshed with the first pinion gears 66 and drivingly coupled to an associated one of the first axleshafts 54L, 54R.

The power switching mechanism 26, hereinafter referred to as a power take-off unit ("PTU"), can generally include a housing 74, an input 78 coupled for common rotation with the first differential case 62 of the first differential 46, an output 82, a transfer gear assembly 86, a disconnect mechanism 90, and a disconnect actuator 94. The input 78 can include a tubular input shaft 98 rotatably supported by the housing 74 and which concentrically surrounds a portion of the first axleshaft 54R. A first end of the input shaft 98 can be coupled for rotation with the first differential case 62. The output 82 can include an output pinion shaft 102 rotatably supported by the housing 74 and having a pinion gear 106. The transfer gear assembly 86 can include a hollow transfer shaft 110, a helical gearset 114, and a hypoid gear 118 that is meshed with the pinion gear 106. The transfer shaft 110 concentrically surrounds a portion of the first axleshaft 54R and is rotatably supported by the housing 74. The helical gearset 114 can include a first helical gear 122 fixed for rotation with the transfer shaft 110 and a second helical gear 126 which is meshed with the first helical gear 122. The second helical gear 126 and the hypoid gear 118 are integrally formed on, or fixed for common rotation with, a stub shaft 130 that is rotatably supported in the housing 74.

The disconnect mechanism 90 can comprise any type of clutch, disconnect or coupling device that can be employed to selectively transmit rotary power from the primary driveline 22 to the secondary driveline 30. In the particular example provided, the disconnect mechanism 90 comprises a clutch having a set of external spline teeth 134, which can be formed on a second end of the input shaft 98, a set of external clutch teeth 138, which can be formed on the transfer shaft 110, a mode collar 142 having internal spline teeth 146 constantly meshed with the external spline teeth 134 on the input shaft 98, and a shift fork 150 (i.e., a movable actuated member) operable to axially translate the shift collar 142 between a first mode position and a second mode position. It will be appreciated that the clutch could include a synchronizer if such a configuration is desired.

The mode collar 142 is shown in FIG. 2 in its first mode position, identified by a "2WD" leadline, wherein the internal spline teeth 146 on the mode collar 142 are disengaged from the external clutch teeth 138 on the transfer shaft 110. As such, the input shaft 98 is disconnected from driven engagement with the transfer shaft 110. Thus, no rotary power is transmitted from the powertrain 14 to the transfer gear assembly 86 and the output pinion shaft 102 of the power take-off unit 26. With the mode collar 142 in its second mode position, identified by an "AWD" leadline, its internal spline teeth 146 are engaged with both the external spline teeth 134 on the input shaft 98 and the external clutch teeth 138 on the transfer shaft 110. Accordingly, the mode collar 142 establishes a drive connection between the input shaft 98 and the transfer shaft 110 such that rotary power from the powertrain 14 is transmitted through the power take-off unit 26 to the output pinion shaft 102. The output pinion shaft 102 is coupled via a propshaft 154 to the secondary driveline 30. The disconnect actuator 94 can include a housing 156 and a plunger 158 that is operable for axially, or linearly moving the shift fork 150 which, in turn, causes concurrent axial translation of the mode collar 142 between the first and second mode positions. The disconnect actuator 94 is shown mounted to the housing 74 of the PTU 26. The disconnect actuator 94 can be a power-operated mechanism that can receive control signals from the control system 34. The disconnect actuator 94 will be discussed in greater detail below, with regard to FIGS. 3-6.

The secondary driveline 30 can include the propshaft 154, a rear drive module ("RDM") 162, a pair of second axleshafts 166L, 166R, and a set of second vehicle wheels 170L, 170R. A first end of the propshaft 154 can be coupled for rotation with the output pinion shaft 102 extending from the power take-off unit 26 while a second end of the propshaft 154 can be coupled for rotation with an input 174 of the rear drive module 162. The input 174 can include input pinion shaft 178. The rear drive module 162 can be configured to transfer rotational input from input 174 to the drive axleshafts 166L, 166R. The rear drive module 162 can include, for example a housing 182, a secondary or second differential (not shown), a torque transfer device ("TTD") (not shown) that is generally configured and arranged to selectively couple and transmit rotary power from the input 174 to the second differential, and a TTD actuator 186. The second differential can be configured to drive the axleshafts 166L, 166R. The TTD can include any type of clutch or coupling device that can be employed to selectively transmit rotary power from the input 174 to the second differential, such as a multi-plate friction clutch for example. The TTD actuator 186 is provided to selectively engage and disengage the TTD, and can be controlled by control signals from the control system 34. The TTD actuator 186 can be any power-operated device capable of shifting the TTD between its first and second modes as well as adaptively regulating the magnitude of the clutch engagement force exerted.

The control system 34 is schematically shown in FIG. 1 to include a controller 190, a group of first sensors 194, and a group of second sensors 198. The group of first sensors 194 can be arranged within the motor vehicle 10 to sense a vehicle parameter and responsively generate a first sensor signal. The vehicle parameter can be associated with any combination of the following: vehicle speed, yaw rate, steering angle, engine torque, wheel speeds, shaft speeds, lateral acceleration, longitudinal acceleration, throttle position, position of shift fork 150, position of mode collar 142, position of plunger 158, and gear position without limitations thereto. The controller 190 can include a plunger displacement feedback loop that permits the controller 190 to accurately determine the position of the plunger 158 or of an element associated with the position of the plunger 158. The group of second sensors 198 can be configured to sense a driver-initiated input to one or more on-board devices and/or systems within the vehicle 10 and responsively generate a second sensor signal. For example, the motor vehicle 10 may be equipped with a sensor associated with a mode selection device, such as a switch associated with a push button or a lever, that senses when the vehicle operator has selected between vehicle operation in a two-wheel drive (FWD) mode and an all-wheel drive (AWD) mode. Also, switched actuation of vehicular systems such as the windshield wipers, the defroster, and/or the heating system, for example, may be used by the controller 190 to assess whether the motor vehicle 10 should be shifted automatically between the FWD and AWD modes.

The vehicle 10 can normally be operated in the two-wheel drive (FWD) mode in which the power take-off unit 26 and the rear drive module 162 are both disengaged. Specifically, the mode collar 142 of the disconnect mechanism 90 is positioned by the disconnect actuator 94 in its first (2WD) mode position such that the input shaft 98 is uncoupled from the transfer shaft 110. As such, substantially all power provided by the powertrain 14 is transmitted to the primary driveline 22. Likewise, the TTD can disconnected such that the input 174, the propshaft 154, the output pinion shaft 102 and the transfer gear assembly 86 within the power take-off unit 26 are not back-driven due to rolling movement of the second vehicle wheels 170L, 170R.

When it is desired or necessary to operate the motor vehicle 10 in the all-wheel drive (AWD) mode, the control system 34 can be activated via a suitable input which, as noted, can include a driver requested input (via the mode select device) and/or an input generated by the controller 190 in response to signals from the first sensors 194 and/or the second sensors 198. The controller 190 initially signals the TTD actuator 186 to engage the TTD to couple the input 174 to the axleshafts 166L, 166R. Specifically, the controller 190 controls operation of the TTD actuator 186 such that the TTD is coupled sufficiently to synchronize the speed of the secondary driveline 30 with the speed of the primary driveline 22. Upon speed synchronization, the controller 190 signals the actuator 94 to cause the mode collar 142 in the power take-off unit 26 to move from its first mode position into its second mode position. With the mode collar 142 in its second mode position, rotary power is transmitted from the powertrain 14 to the primary driveline 22 and the secondary driveline 30. It will be appreciated that subsequent control of the magnitude of the clutch engagement force generated by the TTD permits torque biasing for controlling the torque distribution ratio transmitted from the powertrain 14 to the primary driveline 22 and the secondary driveline 30.

Figure 4:
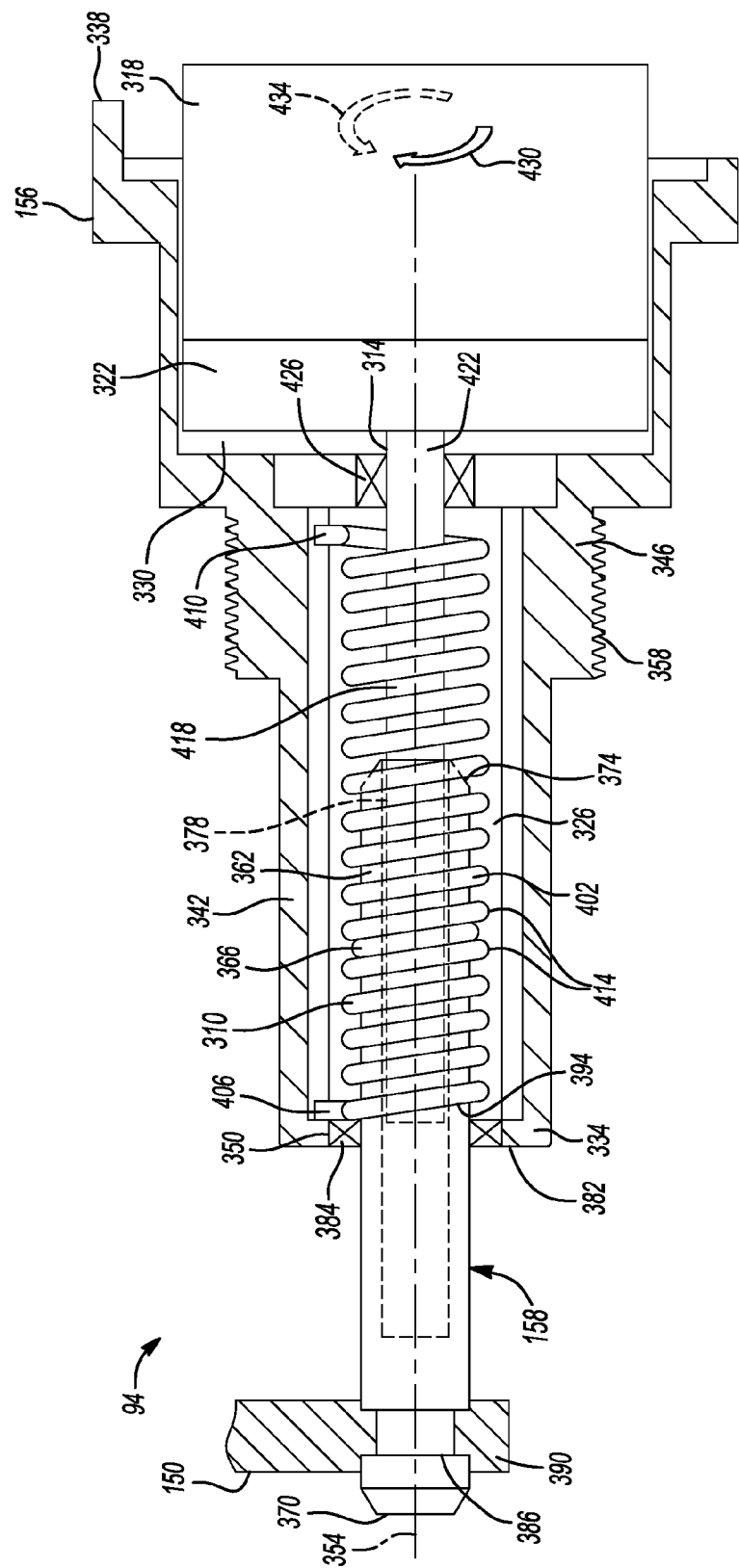
FIG. 4 is a section view of the portion of the power transmitting device of FIG. 3, illustrating a plunger of the actuator in a second position.

With additional reference to FIGS. 3 and 4, the disconnect actuator 94 can be a self-contained power-operated unit that can include the housing 156, the plunger 158, a resilient member 310, and a rotating member 314. The actuator 94 can also include a motor 318, and a gearbox 322. The housing 156 can define a plunger cavity 326, and a motor cavity 330 and can have a first housing end 334 and a second housing end 338 opposite the first housing end 334. The housing 156 can also define a tang groove 342 and a mounting feature 346. The first housing end 334 can define a plunger orifice 350 penetrating through the first housing end 334, to the plunger cavity 326. The plunger 158, resilient member 310, and rotating member 314 can be received within the plunger cavity 326 and disposed about an axis 354. The mounting feature 346 can be configured to mount the housing 156 to the housing 74 of the PTU 26. In the example provided the mounting feature 346 is a plurality of external threads 358 configured to engage a plurality of mating internal threads (not shown) formed on the housing 74.

The plunger 158 can have a plunger body 362 and a follower member 366. The plunger body 362 can be generally cylindrical in shape, disposed about the axis 354, and can have a first plunger end 370 and a second plunger end 374, opposite the first plunger end 370. The plunger body 362 can be rotatably coupled to the housing 156. The plunger can further define a central bore 378 coaxial with the axis 354. The first plunger end 370 can extend from the plunger cavity 326, through the plunger orifice 350 to an exterior side 382 of the first housing end 334. A seal 384 can be received within the plunger orifice 350, and can be configured to form a seal between the housing 156 and the plunger body 362 to prevent debris from penetrating into the plunger cavity 326 and/or prevent lubrication from leaking from the plunger cavity 326. The first plunger end 370 can be configured to be coupled to the shift fork 150. In the example provided, the first plunger end 370 defines a fork groove 386 which extends around the circumference of the first plunger end 370 and the shift fork 150 has a complementary ring 390 that is received within the fork groove 386, though other configurations for coupling the shift fork 150 to the first plunger end 370 can be used. The second plunger end 374 can be disposed within the plunger cavity 326 and fixedly coupled to the follower member 366. In the example provided, the second plunger end 374 is unitarily formed with the follower member 366, though other configurations can be used. The follower member 366 can extend radially outward from the plunger body 362. In the example provided, the follower member 366 is a helically shaped disc, or external thread, extending radially outward from the plunger body 362, though other configurations can be used, such as one or more radially outward extending posts for example. The central bore 378 can be formed through the second plunger end 374 and extend axially into the plunger body 362.

The resilient member 310 can have a first spring end 394 and a second spring end 398 and a plurality of threads 402 extending about the axis 354 between the first and second spring ends 394, 398. In the example provided, the resilient member 310 is a helical coil spring and the plurality of threads 402 are the plurality of helical coils of the coil spring. The first spring end 394 can have a first tang 406 and the second spring end 398 can have a second tang 410, extending radially outward from each spring end 394, 398 and radially outward of the plurality of threads 402. The resilient member 310 can be disposed about the plunger body 362 within the plunger cavity 326 such that the plurality of threads 402 are radially outward of the plunger body 362. The follower member 366 can extend radially outward from the plunger body 362 such that a portion of the follower member 366 is received between a pair of adjacent threads 414. The first and second tangs 406, 410 can be non-rotatably coupled to the housing 156. The first and second tangs 406, 410 can be received in the tang groove 342 and can be axially slidable within the tang groove 342. Alternatively, either, or both of the first and second tangs 406, 410 can be fixedly coupled to the housing 156, such that either, or both of the first and second tangs 406, 410 are neither axially slidable, nor rotatable relative to the housing 156.

The rotating member 314 can be disposed about the axis 354 and have a first end 418 and a second end 422. The first end 418 can be disposed within the plunger cavity 326 and the second end 422 can extend from the motor cavity 330 into the plunger cavity 326. A seal 426 can also be disposed between the rotating member 314 and the housing axially between the plunger cavity 326 and the motor cavity 330 to seal the motor cavity 330 from the plunger cavity 326. The first end 418 of the rotating member 314 can be received in the central bore 378 of the plunger body 362 and non-rotatably coupled to the plunger body 362. The rotating member 314 can be rotatable about the axis 354, and can be axially fixed, while the plunger body 362 can be axially translatable along the rotating member 314. In the example provided, the rotating member 314 is a generally hexagonal rod and the central bore 378 is a mating hexagonal shape, though other configurations can be used, such as a key, or axial splines for example.

The motor 318 and gearbox 322 can be received in the motor cavity 330. The motor 318 can be an electrical motor, and in the example provided, the motor 318 is a DC motor, though other types of motors can be used. The motor 318 can have an output shaft (not shown). The gearbox 322 can have an input member (not shown), an output member (not shown) and a plurality of gears (not shown). The output shaft of the motor 318 can be configured to provide rotational power to the input member of the gearbox 322. The input member of the gearbox 322 can be coupled through the plurality of gears to the output member to transmit rotational power from the input member to the output member. The plurality of gears can be a reduction gearset to drive the output member at a different rotational speed than the input member. The output member of the gearbox 322 can be coupled to the rotational member 314 to provide rotational power to the rotational member 314. The motor 318 can be electrically coupled to the controller 190, such that the controller 190 can control the operation of the motor 318. The motor 318 can be a reversible motor, such that the motor 318 can selectively provide rotational power to the output member in a first rotational direction 430, or a second rotational direction 434. Alternatively, the gearbox 322 can include a selectable reverse gear (not shown) configured to selectively provide rotational power to the output member in either rotational direction 430, 434.

The operation of the actuator 94 of FIGS. 3 and 4 will now be described in detail. FIG. 3 shows the plunger body 362 in a retracted position relative to the housing 156, while FIG. 4 shows the plunger body 362 in an extended position relative to the housing 156. Operation of the motor 318 can cause rotation of the rotating member 314, which can cause the plunger body 362 to rotate about the axis 354. Rotation of the plunger body 362 in the first rotational direction 430 can cause the follower member 366 to rotate along the path of the threads 402. As the follower member 366 is rotated, and follows along the threads 402, the plunger body 362 is translated axially along the axis 354 toward the extended position. Rotation of the plunger body 362 in the second rotational direction 434 can cause the follower member 366 to rotate along the path of threads 402 in the opposite direction such that the plunger body 362 is translated axially toward the retracted position. In the example provided, when the plunger body 362 is in the extended position, the mode collar 142 is in the second mode position, and when the plunger body 362 is in the retracted position, the mode collar 142 is in the first mode position, as described above.

Under some conditions, axial translation of the plunger body 362 can be resisted. For example, when teeth 138 and 146 are not aligned, axial translation of the plunger body 362 can be resisted until the teeth 138 and 146 become aligned and meshingly engage. Under such conditions, when the rotating member 314 is rotated, the follower member 366 can continue to follow the path of the threads 402, while the resilient member 310 compresses to provide axial compliance until the condition subsides, e.g. the teeth 138 and 146 are aligned. Once the condition restraining axial translation subsides, the compressed resilient member 310 can expand to translate the plunger body 362. In the example provided, the resilient member 310 can compress in either axial direction, such that the actuator 94 has axial compliance when extending and when retracting the plunger body 362. The resilient member 310 can be configured such that the axial compliance force can be equal in both axial directions.

Figure 5:
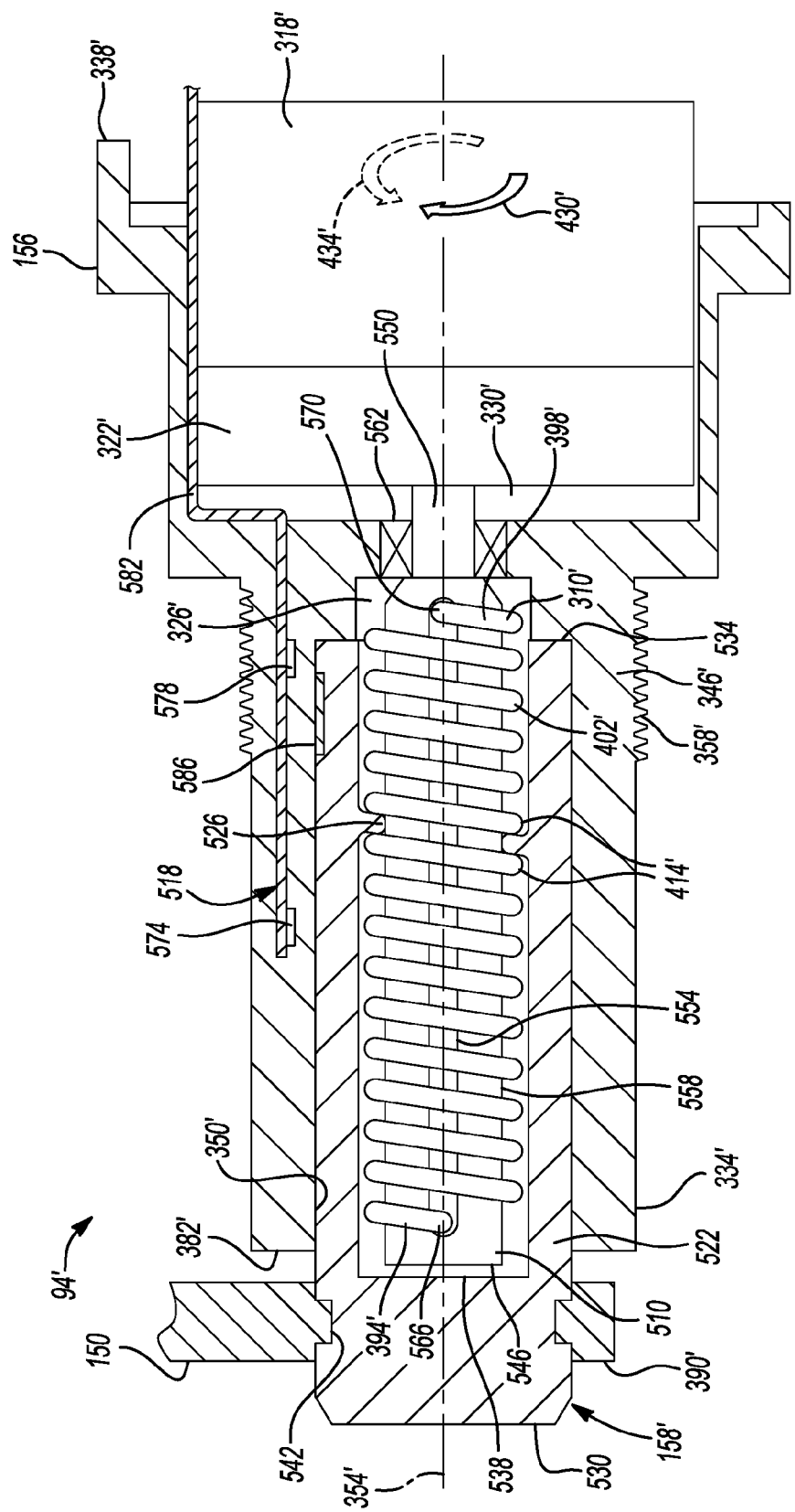
FIG. 5 is a section view of a portion of the power transmitting device of FIG. 1, illustrating an actuator of the power transmitting device of a second construction in more detail.
Figure 6:
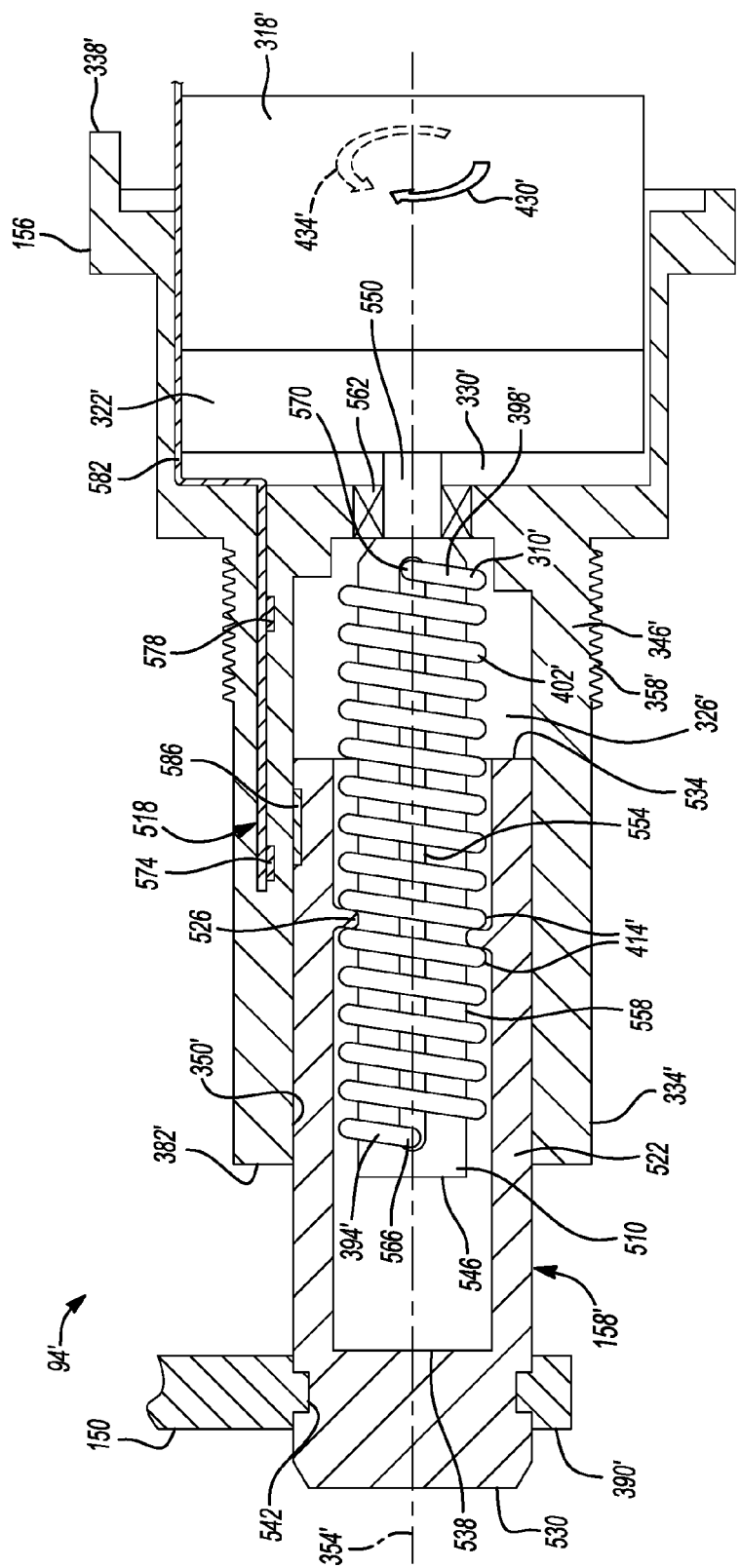
FIG. 6 is a section view of the portion of the power transmitting device of FIG. 5, illustrating a plunger of the actuator in a second position.

With regard to FIGS. 5 and 6, the disconnect actuator 94 of a second construction is shown with respect to reference number 94'. The disconnect actuator 94' is substantially similar to disconnect actuator 94, and as such, only differences are described below. Like reference numbers with regard to disconnect actuator 94' and 94 refer to similar features.

The disconnect actuator 94' can be a self-contained power-operated unit that can include a housing 156', the plunger 158', a resilient member 310', and a rotating member 510. The actuator 94' can also include a motor 318', a gearbox 322', and a set of first sensors 518. The housing 156' can define a plunger cavity 326', and a motor cavity 330' and can have a first housing end 334' and a second housing end 338' opposite the first housing end 334'. The housing 156' can also define a mounting feature 346'. The first housing end 334' can define a plunger orifice 350' penetrating through the first housing end 334', to the plunger cavity 326'. The plunger 158', resilient member 310', and rotating member 510 can be received within the plunger cavity 326' and disposed about an axis 354'. The mounting feature 346' can be substantially similar to mounting feature 346 described above.

The plunger 158' can have a plunger body 522 and a follower member 526. The plunger body 522 can be generally cylindrical in shape, disposed about the axis 354', and can have a first plunger end 530 and a second plunger end 534, opposite the first plunger end 530. The plunger 158' can further define a central bore 538 coaxial with the axis 354'. The plunger body 522 can be non-rotatably, but axially slidably coupled to the housing 156'. The first plunger end 530 can extend from the plunger cavity 326', through the plunger orifice 350' to an exterior side 382' of the first housing end 334'. A seal (not shown) can be received within the plunger orifice 350', and can be configured to form a seal between the housing 156' and the plunger body 522 to prevent debris from penetrating into the plunger cavity 326' and/or prevent lubrication from leaking from the plunger cavity 326'. The first plunger end 530 can be configured to be coupled to the shift fork 150. In the example provided, the first plunger end 530 defines a fork groove 542 which extends around the circumference of the first plunger end 530 and the shift fork 150 has a complementary ring 390' that is received within the fork groove 542 though other configurations for coupling the shift fork 150 to the first plunger end 530 can be used. The central bore 538 can be formed through the second plunger end 534 and extend axially into the plunger body 522. The second plunger end 534 can be disposed within the plunger cavity 326' and fixedly coupled to the follower member 526. In the example provided, the second plunger end 534 is unitarily formed with the follower member 526, though other configurations can be used. The follower member 526 can extend radially inward from the interior of the central bore 538 of the plunger body 522. In the example provided, the follower member 526 is a helically shaped shoulder, or internal thread, extending radially inward from the plunger body 522, though other configurations can be used, such as one or more radially inward extending posts for example.

The rotating member 510 can be disposed about the axis 354' and have a first end 546 and a second end 550. The first end 546 can define a tang groove 554 that is recessed radially inward from an external surface 558 of the rotating member 510, and extends axially along the first end 546. In the example provided, the first end 546 is a generally cylindrical rod, though other configurations can be used. The first end 546 can be disposed within the plunger cavity 326' and the second end 550 can extend from the motor cavity 330' into the plunger cavity 326'. A seal 562 can also be disposed between the rotating member 510 and the housing axially between the plunger cavity 326' and the motor cavity 330' to seal the motor cavity 330' from the plunger cavity 326'. The first end 546 of the rotating member 510 can be received in the central bore 538 of the plunger body 522 and can be rotatably coupled to the plunger body 522. The rotating member 510 can be rotatable about the axis 354' and can be axially fixed within the housing 156'.

The resilient member 310' can have a first spring end 394' and a second spring end 398' and a plurality of threads 402' extending about the axis 354' between the first and second spring ends 394', 398'. In the example provided, the resilient member 310' is a helical coil spring and the plurality of threads 402' are the plurality of helical coils of the coil spring. The first spring end 394' can have a first tang 566 and the second spring end 398' can have a second tang 570, extending radially inward from each spring end 394', 398' and radially inward of the plurality of threads 402'. The resilient member 310' can be disposed within the plunger body 522 within the plunger cavity 326' such that the plurality of threads 402' are radially inward of the plunger body 522. The follower member 526 can extend radially inward from the plunger body 522 such that a portion of the follower member 526 is received between a pair of adjacent threads 414'. The first and second tangs 566, 570 can be non-rotatably coupled to the rotating member 510. The first and second tangs 566, 570 can be received in the tang groove 554 and can be axially slidable within the tang groove 554. Alternatively, either, or both of the first and second tangs 566, 570 can be fixedly coupled to the rotating member 510, such that either, or both of the first and second tangs 566, 570 are neither axially slidable, nor rotatable relative to the rotating member 510.

The motor 318' and gearbox 322' can be received in the motor cavity 330 and can be substantially similar to motor 318 and gearbox 322. The output member of the gearbox 322' can be coupled to the rotating member 510 to provide rotational power to the rotating member 510. The motor 318' can be electrically coupled to the controller 190, such that the controller 190 can control the operation of the motor 318'.

The set of first sensors 518 can be within the group of first sensors 194 described above with regard to FIGS. 1 and 2, and can be configured to send signals to the controller 190 indicative of the position of the plunger body 522. In the example provided, the set of first sensors 518 includes a first sensor element 574, a second sensor element 578, wire 582, and a sensor target 586. The first and second sensor elements 574, 578 can be fixedly disposed within the housing 156' proximate to the plunger cavity 326' and can be radially outward of the plunger body 522. The wire 582 can be configured to electrically couple the first and second sensor elements 574, 578 to the controller 190. The sensor target 586 can be coupled for axial motion with the plunger body 522 and can be configured to be detected by the first and second sensor elements 574, 578. In the example provided, the sensor elements are hall-effect sensors and the sensor target 586 is a permanent magnet having a field detectable by the first and second sensor elements 574, 578, though other types of sensors and targets can be used. In an alternative construction, not specifically shown, the first and second sensor elements 574, 578 can be coupled to the plunger body 522 for common axial movement, while the sensor target 586 can be fixedly coupled to the housing 156'. While the first sensors 518 are shown with regard to actuator 94', it is understood that similar sensors can be used with regard to actuator 94.

The operation of the actuator 94' of FIGS. 5 and 6 will now be described in detail. FIG. 5 shows the plunger body 522 in a retracted position relative to the housing 156', while FIG. 6 shows the plunger body 522 in an extended position relative to the housing 156'. Operation of the motor 318' can cause rotation of the rotating member 510, which can cause the resilient member 310' to rotate about the axis 354'. Rotation of the resilient member 310' in the first rotational direction 430' can cause the follower member 526 to follow along the path of the threads 402'. As the follower member 526 follows along the threads 402' of the rotating resilient member 310', the plunger body 522 is translated axially along the axis 354' toward the extended position. Rotation of the resilient member 310' in the second rotational direction 434' can cause the follower member 526 to follow along the path of the threads 402' in the opposite direction such that the plunger body 522 is translated axially toward the retracted position. In the example provided, when the plunger body 522 is in the extended position, the mode collar 142 is in the second mode position, and when the plunger body 522 is in the retracted position, the mode collar 142 is in the first mode position, as described above.

Under some conditions, axial translation of the plunger body 522 can be resisted. For example, when teeth 138 and 146 are not aligned, axial translation of the plunger body 522 can be resisted until the teeth 138 and 146 become meshingly engaged. Under such conditions, when the rotating member 510 and resilient member 310' are rotated, the follower member 526 can continue to follow the path of the threads 402', while the resilient member 310' compresses to provide axial compliance until the condition subsides, e.g. the teeth 138 and 146 are aligned. Once the condition restraining axial translation subsides, the compressed resilient member 310' can expand to translate the plunger body 522. In the example provided, the resilient member 310' can compress in either axial direction, such that the actuator 94' has axial compliance when extending and when retracting the plunger body 522. The resilient member 310' can be configured such that the axial compliance force can be equal in both axial directions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An actuator comprising:
a coil spring, a plunger, and a rotating member, the coil spring including a plurality of coils disposed about an axis, the plunger including a plunger body and a follower member fixedly coupled to the plunger body, the plunger body being disposed about the axis, the follower member being received between adjacent ones of the plurality of coils, the rotating member being rotatable about the axis and coupled to one of the coil spring and the plunger to rotate the one of the coil spring and the plunger about the axis;
wherein rotation of the rotatable member effects either translation of the plunger, compression of the coil spring, or both translation of the plunger and compression of the coil spring.

2. The actuator of claim 1, wherein the plunger body is disposed radially within the coil spring and the follower member extends radially outward from the plunger body.

3. The actuator of claim 2, wherein the actuator includes an actuator housing, and the coil spring is disposed radially within the actuator housing and is non-rotatably coupled to the actuator housing.

4. The actuator of claim 1, wherein the coil spring is disposed radially within the plunger body and the follower member extends radially inward from the plunger body.

5. The actuator of claim 4, wherein the coil spring is non-rotatably coupled to the rotating member.

6. The actuator of claim 1, wherein the actuator includes an actuator housing and a motor, the actuator housing defining a plunger cavity and a motor cavity, the plunger and coil spring being received within the plunger cavity, the motor being received within the motor cavity and having a motor output shaft, the motor output shaft being coupled to the rotating member to rotate the rotating member.

7. The actuator of claim 1, wherein the follower member has a helical shape.

8. The actuator of claim 1, further comprising a sensor and a sensor target, one of the sensor and the sensor target being coupled to the plunger for common axial movement with the plunger, the sensor being configured to output a signal indicative of a position of the sensor relative to the sensor target.

9. An actuator comprising:
an actuator housing, a first member, a plunger, and a rotating member, the first member being disposed within the actuator housing and having a plurality of threads disposed about an axis, the plurality of threads being expandable and contractible along the axis, the first member being non-rotatably coupled to one of the rotating member and the actuator housing, the plunger including a plunger body and a follower member fixedly coupled to the plunger body, the follower member extending radially from the plunger body between adjacent ones of the plurality of threads, the rotating member being rotatable about the axis and coupled to one of the first member and the plunger body to rotate the one of the first member and the plunger body about the axis;

wherein rotation of the rotatable member effects either translation of the plunger, compression of the threads, or both translation of the plunger and compression of the threads.

10. The actuator of claim 9, wherein the plunger body is disposed radially within the threads of the first member and the follower member extends radially outward from the plunger body.

11. The actuator of claim 10, wherein the threads of the first member are disposed radially within the actuator housing and are non-rotatably coupled to the actuator housing.

12. The actuator of claim 9, wherein the threads of the first member are disposed radially within the plunger body and the follower member extends radially inward from the plunger body.

13. The actuator of claim 12, wherein the threads of the first member are non-rotatably coupled to the rotating member.

14. The actuator of claim 9, wherein the actuator includes a motor, and the actuator housing defines a plunger cavity and a motor cavity, the plunger and the threads of the first member being received within the plunger cavity, the motor being received within the motor cavity and having a motor output shaft, the motor output shaft being coupled to the rotating member to transmit rotary power between the rotating member and the motor output shaft.

15. The actuator of claim 9, wherein the follower member has a helical shape.

16. The actuator of claim 9, further comprising a sensor and a sensor target, one of the sensor and the sensor target being coupled to the plunger for common axial movement with the plunger, the sensor being configured to output a signal indicative of a position of the sensor relative to the sensor target.

17. An actuator comprising:
an actuator housing, an axially resilient member, a rotating member, and a plunger, the axially resilient member being disposed within the actuator housing, the axially resilient member including a first end, a second end, and a plurality of helical threads disposed about an axis and extending between the first and second ends, the first and second ends being non-rotatably coupled to one of the rotating member and the actuator housing, the plunger including a plunger body and a follower member fixedly coupled to the plunger body, the follower member extending radially from the plunger body between adjacent threads of the axially resilient member, the rotating member being rotatable about the axis and coupled to one of the axially resilient member and the plunger to rotate the one of the axially resilient member and the plunger about the axis;

wherein rotation of the rotatable member effects either translation of the plunger, compression of the axially resilient member, or both translation of the plunger and compression of the axially resilient member.

18. The actuator of claim 17, wherein the plunger body is disposed radially within the axially resilient member and the follower member extends radially outward from the plunger body.

19. The actuator of claim 18, wherein the axially resilient member is disposed radially within the actuator housing and is non-rotatably coupled to the actuator housing.

20. The actuator of claim 17, wherein the axially resilient member is disposed radially within the plunger body and the follower member extends radially inward from the plunger body.

21. The actuator of claim 20, wherein the axially resilient member is non-rotatably coupled to the rotating member.

22. The actuator of claim 17, wherein the actuator includes a motor, and the actuator housing defines a plunger cavity and a motor cavity, the plunger and axially resilient member being received within the plunger cavity, the motor being received within the motor cavity and having a motor output shaft, the motor output shaft being drivingly coupled to the rotating member.

23. The actuator of claim 17, further comprising a sensor and a sensor target, one of the sensor and the sensor target being coupled to the plunger for common axial movement with the plunger, the sensor being configured to output a signal indicative of a position of the sensor relative to the sensor target.

* * * * *